May 26, 1959
T. R. WELCH ET AL
2,888,196
CALORIE COUNTER
Filed Sept. 17, 1957
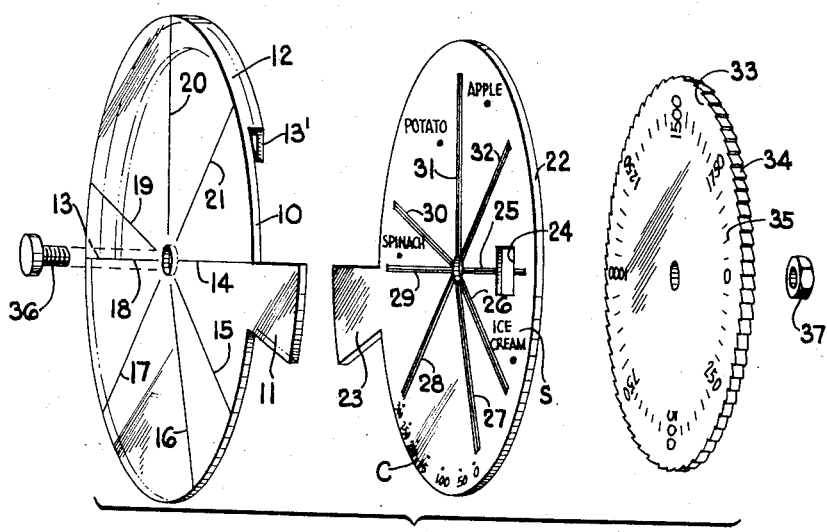
FIG. 1
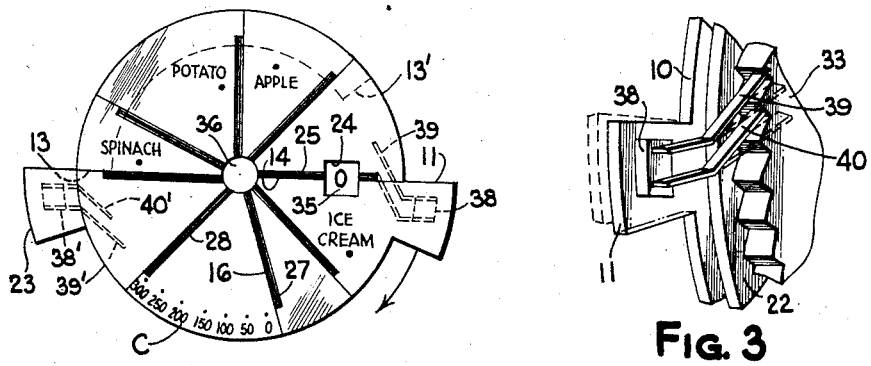
FIG. 2
FIG. 3
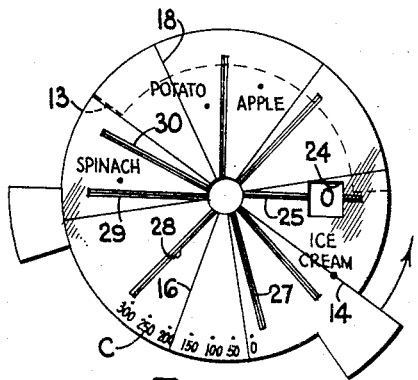
FIG. 4
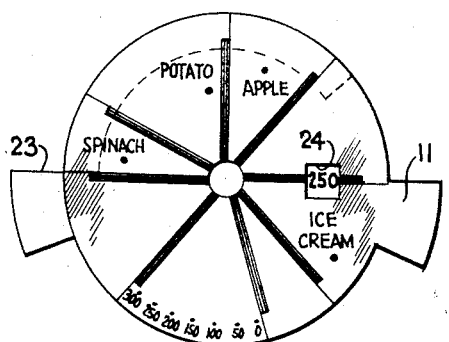
FIG. 5
INVENTORS
THOMAS R. WELCH
MARTIN S. GOLDFARB
BY
Elliott & Pastoriza
ATTORNEYS

United States Patent Office 2,888,196
Patented May 26, 1959

2,888,196

CALORIE COUNTER

Thomas R. Welch, Los Angeles, and Martin S. Goldfarb, Hollywood, Calif.

Application September 17, 1957, Serial No. 684,554

10 Claims. (Cl. 235—78)

This invention relates generally to computers and more particularly to a novel manually operated computer for summing numerical magnitudes assigned to given symbols.

A general object of the present invention is to provide a simple computing device for providing both an immediate indication of a numerical quantity assigned to a certain symbol and the sum of several different such numerical quantities corresponding to several different symbols.

More particularly, it is an object to provide a manually operable slide rule type computer which may be readily operated by unskilled personnel to provide, in a convenient and readily interpretable fashion desired numerical information concerning various objects.

A specific object of the invention is to provide a computing device for counting the number of calories consumed by an individual over a given period of time and indicating the total calorie count by a single sum numeral.

From the foregoing, it will be evident that the present invention has wide application for performing varied types of summing operations. In order to illustrate clearly the principles of this invention, however, the preferred embodiment thereof will be described specifically in connection with the counting and summing of calories consumed by an individual as set forth in the third object. It is to be understood, however, that this invention is by no means limited to this specific application.

Briefly, the invention comprises a first member provided with an index line, a second member including various symbols thereon movable into positions juxtaposed the index line on the first member, and a third member including consecutive numerals spaced thereon and arranged to be moved with respect to both the first and second members. A coupling means is provided between the first and third members connecting them for simultaneous movement when the first member is moved in a first direction and disconnecting them when the first member is moved in an opposite direction. The arrangement is such that the third member serves to accumulate by numerical indications the sum of the various movements of the first member in said one direction. The three members may be arranged as in a conventional rectilinear slide rule or alternatively, in the form of a circular slide rule comprising three co-axial discs mounted for relative rotation. The preferred embodiment of this invention contemplates the latter structure and the computer will be described with respect to circular type discs forming the various members. It should be understood, however, that the invention is not limited to this particular arrangement.

A thorough understanding of this invention will be had by now referring to a detailed description of the preferred embodiment illustrated in the accompanying drawings, and in which:

Figure 1 is a perspective exploded view of the various elements making up the computer;

Figure 2 is a front view of the assembled computer;

Figure 3 is a fragmentary perspective view illustrating coupling means between two of the discs of Figure 1;

Figure 4 is another plan view similar to Figure 2 illustrating the relative position of the first two discs after performing a first step in the operation of the computer; and, Figure 5 is a view similar to Figure 4 after performing a second step in the operation of the computer.

With respect to the specific application chosen for illustrative purposes, the primary purpose of the computer is to provide an indication of the total number of calories consumed by an individual during a given period of time. To this end, the computer as illustrated in Figure 1 comprises a transparent top disc 10 provided with a radially extending operating tab 11. Also included as a structural portion of the disc 10 is a rearward and downwardly extending arcuate holding flange 12, the purpose for which will become clearer as the description proceeds. The far end of the flange 12 as viewed in Figure 1 terminates in a stop 13 as indicated by the dotted lines. As shown, the front face of the transparent disc 10 includes a series of radial indexing lines indicated at 14, 15, 16, 17, 18, 19, 20 and 21.

Also included as a portion of the computer is a second or center disc illustrated in Figure 1 at 22 including a radially extending holding tab 23. The top edge of this tab 23 is adapted to be engaged by the end stop portion 13 of the flange 12 of the disc 10 in Figure 1 when the disc 22 is co-axially positioned next to the disc 10 all as will become clearer as the operation of the system is described. Center disc 22 is preferably opaque with the exception of a window 24 spaced a given radial distance from the center of the disc. On the face of the disc 22, there are provided a series of radially extending boundary lines indicated at 25, 26, 27, 28, 29, 30, 31, and 32. These boundary lines are visible through the transparent disc 10 and register with the radial indexing lines 14 through 21 of the disc 10 when the top and center discs are in assembled relationship and the stop 13 is in abutting engagement with the top edge of the holding tab 23.

The last element of the computer comprises a third or bottom disc shown in Figure 1 at 33 provided with ratchet teeth or serrations about its periphery as indicated at 34. The front face of the bottom disc 33 includes a numerical sequence extending circumferentially about the face of the disc at a given radial distance from the center corresponding to the radial distance of the window 24 from the center disc 22 such that certain ones of the numerals on the disc 33 are exposed through the window 24 when the various discs are in assembled relationship.

With respect to the specific example of calorie counting, the face of the center disc 22 includes various symbols S between the radial boundary lines, these symbols constituting descriptions of different foods. For example, the symbols S may include ice cream, spinach, potato, and apple. In the actual embodiment of the invention, substantially all of the commonly consumed foods in this country are set forth on the front face of the disc 22. The four specific food products set forth are merely illustrative and chosen simply as examples to avoid obscuring the drawings. Each of the symbols or words representing the foods has a small indexing point or dot associated therewith the purpose for which will become clearer as the description proceeds.

The three discs illustrated in Figure 1 are secured together in co-axial assembled relationship by means of a screw 36 and nut 37.

Referring now to Figure 2, the various assembled discs are illustrated in plan view wherein it will be noted that the stop illustrated in dotted lines for the flange 12 is in abutting relationship with the radial holding tab 23 and the numeral 0 on the scale 35 of the bottom disc 33 is exposed through the window opening 24 of the center disc. Further, it will be noted that the radial indexing lines are in registration with the radial boundary lines, such as the radial indexing line 16 and the radial boundary line 27.

In accordance with a structural feature of the invention, a coupling means is provided between the top disc 10 and the bottom disc 33 which serves to connect the bottom disc for rotation with the top disc when the top disc is rotated in one direction and to disconnect the bottom disc from the top disc when the top disc is rotated in an opposite direction. This coupling means is illustrated clearly in the fragmentary view of Figure 3 wherein it will be noted that there is provided a mounting base 38 on the underside of the radially projecting operating tab 11 mounting two ratchet spring fingers 39 and 40 bent to intercept the serrated peripheral edge 34 of the bottom disc 33 at acute angles. An identical coupling arrangement comprising a base 38' and ratchet fingers 39' and 40' is provided on the underside of the holding tab 23 are illustrated in dotted lines in Figure 2. By this arrangement, it will be evident that rotation of the top disc in a clockwise direction as viewed in Figure 2 will result in the spring fingers 39 and 40 simply riding over the various ratchet teeth or serrations in the bottom disc while the spring fingers 39' and 40' engage the teeth on the opposite portion of the disc to hold the bottom disc stationary with respect to the center disc. Counterclockwise rotation of the top disc, however, will result in the free ends of the spring fingers 39 and 40 securely engaging the ratchet teeth to cause simultaneous counterclockwise rotative movement of the bottom disc 33. In this latter movement, the fingers 39' and 40' simply ride over the teeth. By mounting the spring fingers on the tabs as shown, it is possible to flex the tabs forwardly out of the plane of their associated discs to disengage the spring fingers from the ratchet teeth and thus enable independent rotation of the discs. This flexed position for the tab 11 is illustrated in dotted lines in Figure 3.

With the various discs in assembled relation as illustrated in Figure 2, the arcuate flange structure 12 is arranged to encompass outer peripheral portions of the center and bottom discs so that the three discs are held in substantially parallel relationship while the central screw 36 and nut 37 serve as a rotating shaft for the respective discs. In operating the device, the radially extending holding tab 23 associated with the center disc 22 is held by the operator's left hand while the radially extending operating tab 11 is rotated by the right hand.

As a specific example of determining the number of calories in various foods by means of the above described computer, assume that a person wishes to determine the number of calories in a dish of ice cream. With the various discs in the initial starting position illustrated in Figure 2, the person rotates the top disc by means of the operating tab 11 in a clockwise direction until the first radial indexing line 14 intersects the indexing point or dot associated with the symbol "Ice Cream." This new rotative position of the top disc is illustrated in Figure 4.

As a consequence of the particular ratcheting arrangement described in Figure 3, the bottom disc 33 will not rotate with the top disc and thus the numeral 0 will still appear in the window 24. The person then rotates the top disc in a counterclockwise direction back to its initial position wherein the stop 13 on the flange 12 abuts against the radially extending tab 23. This return position is illustrated in Figure 5, but it will now be noted that the numerical value 250 appears in the window 24. This numerical value results from the ratcheting fingers 39 and 40 causing simultaneous movement of the bottom disc with the top disc in this counterclockwise direction to bring the numeral 250 in registration with the window. The numeral 250 indicates the number of calories in the dish of ice cream.

If the person also had, for example, a potato, and he wished to add in the calories of this potato to that of the ice cream, then he again rotates the top disc from the position illustrated in Figure 5 until the radial indexing line 18 as illustrated in Figure 4 intersects the symbol for potato. This latter position is substantially the same as the position illustrated in Figure 4 for the ice cream such that counterclockwise rotation of the top disc back to its initial position results in movement of the third or bottom disc 33 substantially the same amount whereby there would now appear the numeral 500 in the window 24 since the number of calories in the potato is essentially the same as in the dish of ice cream. This process may be continued until all of the food consumed during the day have been totaled, the final sum appearing in the window 24.

It will now be evident from the above description that the symbol for the potato could have been included in the same sector portion of the center disc as the ice cream inasmuch as the potato and the ice cream have substantially the same number of calories. In other words, the potato symbol could be positioned in radial alignment with the ice cream symbol. In fact, one mode of construction of the computer of this invention could include all of the various foods in a first sector portion there being only necessary one radial indexing line such as the line 14 which may be aligned with all of the various foods in the first sector. Since, however, there are many foods which have the same number of calories, the symbolic representation of these foods on a single radial line extending from the central portion of the center disc towards the periphery becomes extremely crowded. Further, only a small portion of the total disc area is employed. Therefore, in accordance with an important feature of the present invention, several sector shaped areas of the disc are employed and multiple indexing lines are used. Thus, insofar as the potato is concerned, the boundary line 30 indicates the initial zero starting point for the radial indexing line 18 whereas insofar as the ice cream is concerned, the boundary radial line 25 serves as the initial zero starting point for the radial indexing line 14. In the same manner, the other boundary radial lines on the center disc each serve as initial zero starting points for the corresponding radial indexing lines on the top disc. By this arrangement of multiple zero indexing lines, a far greater amount of information may be included on the disc area than is the case if only a single sector were used. Again, for example, in Figure 4, the ice cream was noted to have substantially the same number of calories as the potato and yet these two symbols are widely separated on the disc face whereby any crowding is minimized.

A further advantage of providing the radial boundary lines to serve as multiple zero starting points, resides in the fact that this arrangement enables various foods to be grouped and thus easily located in such groups. For example, all of the beverages, soups, and juices may be included in a sector portion between two radial boundary lines. Further, the leafy vegetables such as spinach as indicated between the boundary lines 29 and 30 and which all have a number of calories lying within a certain range can be grouped under leafy greens. Similarly, the milk products such as ice cream can all be grouped together in a particular sector.

To facilitate further the reading of various food symbols, the various sectors may be colored. For example, the area between the radial boundary lines 29 and 30 for leafy vegetables could be colored with a background green.

It will be evident that in totalizing the number of calories a person has consumed in a day, he may wish to ascertain the number of calories in a specific food he has eaten, but which number is not readily determinable by viewing through the window 24 since it is in additive relation to the previous calories set forth. Accordingly, a further feature of the invention includes a small numerical scale indicated by the letter C in Figures 1, 2, 4, and 5 between the boundary radial lines 27 and 28 on the center disc 22. With respect to this scale C, the radial indexing lines 16 starting from the zero point as determined by the radial boundary point 27 serves as the indexing line for the individual number of calories in the individual food selected. For example, in the case of the ice cream as illustrated in Figure 4, it will be noted that the radial indexing line 16 has been moved from the boundary line 27 in a clockwise direction to a numeral on the scale C equal substantially to 250 indicating that ice cream has 250 calories. When the top disc is returned to the initial position as illustrated in Figure 5, while the numeral 250 is displayed in the window 24, the radial indexing line 16 has returned to the zero indication on the scale C so that in a subsequent feed selection, the radial indexing line 16 will indicate on the scale C the number of calories for that particular food. This number will then be added to the number appearing in the window 24 upon counter clockwise movement of the top disc back to its starting position.

It will be immediately evident from the above description, that the ratcheting fingers 39 and 40 and 39' and 40' could respectively extend in opposite directions to drive the bottom disc 33 simultaneously with the top disc when the top disc is moved in a clockwise direction wherein the numeral 250 would appear through the window 24 when the top disc is in the position illustrated in Figure 4. Return of the top disc to its initial position would then not affect the bottom disc since the latter would be locked to the center disc by the fingers 39' and 40' and the number 250 would still appear in the window as illustrated in Figure 5. A subsequent operation would then result in movement of the bottom disc with the top disc when rotated in a clockwise direction to accumulate the count as indicated through the window 24.

After each of the individual foods consumed by the operator during a day, for example, has been selected and the various rotation and counter rotation operations of the top disc effected, the final numeral appearing in the window 24 will indicate the sum of the calories consumed. The operator may easily reset the bottom disc 33 to zero by simply manually rotating this disc in a counter clockwise direction until zero appears in the window at the same time holding the radial tabs 23 and 11 in their initial positions as illustrated in Figures 2 and 5. Alternatively, the operator may flex the tabs forwardly to move the respective fingers laterally away from the teeth thus freeing the bottom disc for rotation in either direction as described heretofore. A particular advantage of this uncoupling of the ratchet fingers by a simple bending or flexing of the tabs resides in the fact that should the operator move one of the indexing lines inadvertently beyond the selected food mark, he can backtrack without affecting the count number.

The provision of pairs of spring fingers on each of the tabs not only doubles the reliability of the counter in the event one finger should break but additionally enables indexing of the bottom disc in half steps. For example, referring to Figure 3, if it is assumed that there are 180 ratchet teeth 34 spaced two degrees apart, by adjusting the length of the spring finger 39 to fall at a half way point between two adjacent teeth when the finger 40 is fully engaged with one tooth, then each finger will work alternately to step the disc 33 in increments of one degree.

Although only the rear end of the arcuate flange 12 has been described as a stop, it should be noted that the front end 13' thereof will also act as a stop for clockwise rotation of the top disc upon abutting the underside of the tab 23. In fact, the flange 12 could be circumferentially extended around the top disc to bring the front stop 13' closer to the underside of the tab and thus decrease the degree of clockwise movement further. However, the adjustment of this front stop would always be designed such that the top disc may swing through the widest contemplated sector area on the second disc before being checked.

As mentioned heretofore, while this invention has been described with respect to counting calories of various food products, the symbols set forth on the face of the center disc 22 could represent other products than foods and the calorie assignment to the foods could be corresponding simple numerical magnitudes assigned to these other symbols whereby this computer may be used for a variety of different purposes.

Many modifications that fall within the scope and spirit of this invention will, therefore, readily occur to those skilled in the art. Thus, while the invention has been described with respect to a specific embodiment in a preferred application, the summing computer is not to be thought of as limited to this specific embodiment chosen for illustrative purposes.

What is claimed is:

1. A count accumulating device comprising, in combination: a first member having at least one indexing line thereon; a second member movably mounted to said first member and including symbols adapted to be aligned with said indexing line; a third member movably mounted to said second member and including indicia spaced thereon; and coupling means connected between said first member and said third member connecting said third member to said first member for simultaneous movement with said first member when said first member is moved in one direction; and disconnecting said third member from said first member when said first member is moved in an opposite direction.

2. A device according to claim 1, in which said first member is transparent and disposed in at least partial overlapping relationship with said second member whereby said symbols are visible through said first member; and said second member includes a window opening in at least partial overlapping relationship with said third member whereby certain of said indicia are visible through said window.

3. A computer for summing numerical magnitudes assigned to given symbols comprising, in combination: a transparent top disc having at least one radial indexing line; a center disc co-axially mounted under said top disc including said symbols on one face whereby said indexing line may be moved to any one of said symbols as observed through said top disc upon rotation of said top disc with respect to said center disc; a bottom disc co-axially mounted to said center disc including numerals consecutively distributed circumferentially adjacent the periphery of said bottom disc at a given radial distance from the center of said bottom disc, said center disc including a window at a radial distance from the center of said center disc equal to said given radial distance whereby said numerals are successively exposed through said window upon rotation of said bottom disc with respect to said center disc; and coupling means connecting said top disc to said bottom disc for rotating said bottom disc simultaneously with said top disc when said top disc is rotated in one direction and disconnecting said bottom disc from said top disc when said top disc is rotated in the opposite direction.

4. A computer according to claim 3, in which said coupling means include at least one ratchet finger secured to said top disc and positioned to engage a portion of said bottom disc at an acute angle to force said bottom disc to rotate with said top disc when said top disc is rotated in said one direction.

5. A computer according to claim 4, in which said portion of said bottom disc comprises at least a portion of the peripheral edge thereof said portion including ratchet teeth.

6. A computer according to claim 3, including holding tab means radially projecting from an edge portion of said center disc beyond the periphery of said top disc; operating tab means radially projecting from the periphery of said top disc; and stop means on said top disc adapted to abut said holding tab means to limit the degree of relative rotation of said top disc with respect to said center disc.

7. A computer according to claim 6, in which said symbols indicate various foods and said numerical magnitudes constitute the number of calories in said foods.

8. A computer according to claim 6, including additional radial indexing lines on said top disc; said symbols on said center disc being divided into sector shaped groups by radial boundary lines, said boundary lines registering with said additional radial indexing lines when said stop means is in engagement with said holding tab means.

9. A computer according to claim 6, in which said coupling means includes a first pair of spring fingers secured to the underside of said operating tab means and positioned to intercept the peripheral edge of said bottom disc at an acute angle for driving said bottom disc in unison with said top disc when said top disc is rotated in said one direction; and a second pair of spring fingers secured to the underside of said holding tab means and positioned to intercept the peripheral edge of said bottom disc at an acute angle for holding said bottom disc stationary with respect to said center disc when said top disc is rotated in said opposite direction, said tab means being flexible and adapted to be bent out of the plane of their associated discs to move said pair of fingers laterally and disengage said bottom disc.

10. A computer according to claim 9, in which said bottom disc includes ratchet teeth in its peripheral edge separated by a given spacing, the free end of one of said fingers in each pair being spaced behind the other by one-half said given spacing.

References Cited in the file of this patent
UNITED STATES PATENTS

| | | |
|---|---|---|
| 2,637,498 | Pond | May 5, 1953 |
| 2,702,669 | Hallowell | Feb. 22, 1955 |
| 2,707,592 | Rice | May 3, 1955 |
| 2,779,541 | Rick | Jan. 29, 1957 |